United States Patent
Huang

[19]

[11] Patent Number: 6,109,579
[45] Date of Patent: Aug. 29, 2000

[54] HIDDEN TYPE HOOK DEVICE

[76] Inventor: Han-Ching Huang, P.O. Box 63-247, No. 12, Alley 111, Lane 437, Chen Hsing Road, Taichung, Taiwan

[21] Appl. No.: 09/159,541

[22] Filed: Sep. 24, 1998

[51] Int. Cl.[7] .............................. E04G 3/00; F16B 45/00
[52] U.S. Cl. ....................... 248/294.1; 248/304; 248/308
[58] Field of Search ................................ 248/294.1, 304, 248/308, 292.13

[56] References Cited

U.S. PATENT DOCUMENTS

| | | | |
|---|---|---|---|
| 638,813 | 11/1899 | Ryan | 248/294.1 |
| 1,145,684 | 3/1915 | Jackson | 248/294.1 |
| 2,071,257 | 8/1937 | Hansen | 248/294.1 |
| 2,077,629 | 2/1937 | Lahr | 248/294.1 |
| 3,018,995 | 1/1962 | Oakley | 248/294.1 |
| 3,289,989 | 12/1966 | Ferenz | 248/294.1 |
| 3,770,234 | 11/1973 | Fovall | 248/294.1 |

FOREIGN PATENT DOCUMENTS 24517 of 1903 United Kingdom ................ 248/294.1

*Primary Examiner*—Ramon O. Ramirez
*Assistant Examiner*—Jerome A. DeLuca
*Attorney, Agent, or Firm*—Charles E. Baxley, ESQ

[57] ABSTRACT

A hook device includes a panel having a compartment defined therein. A hook includes a first section pivotally connected to the panel and a second hooked section removably received in the compartment. An elastic member is provided for moving the second hooked section of the hook outside the compartment. A push button is provided for releasably retaining the second hooked section of the hook in the compartment.

1 Claim, 5 Drawing Sheets

HIDDEN TYPE HOOK DEVICE

BACKGROUND OF THE INVENTION

1. Field of the Invention

The present invention relates to a hidden type hook device, in which the hook is hidden when not in use.

2. Description of the Related Art

Trucks or the like generally includes a number of hooks for winding and fixing ropes or strings. However, the hooks are exposed and thus might cause injury to people. The present invention is intended to provide a device to solve this problem.

SUMMARY OF THE INVENTION

It is a primary object of the present invention to provide a hidden type hook device in which the hook is hidden when not in use.

A hook device in accordance with the present invention comprises a panel including a compartment, a hook including a first section pivotally connected to the panel and a second hooked section removably received in the compartment, an elastic means for moving the second hooked section of the hook outside the compartment, and a push button for releasably retaining the second hooked section of the hook in the compartment.

The second hooked section is received in the compartment when the push button is in a first position that engages with the second hooked section. The second hooked section is moved outside the compartment when the push button is moved to a second position that disengages from the second hooked section.

The second hooked section of the hook includes a protrusion or groove, and the push button includes an engaging end slidably extended into the compartment for releasably engaging with the protrusion or groove.

A second elastic means may be provided for biasing the push button to a position for engaging with the second hooked section of the hook.

In a preferred embodiment of the invention, the compartment of the panel is T shaped and includes a vertical section and a horizontal section. Each of two end walls that define two ends of the horizontal section includes a receptacle defined therein. The panel further comprises two positioning holes defined therein, each positioning hole being communicated with an associated receptacle. The first section of the hook is pivotally received in the horizontal section of the compartment. The first section of the hook includes two reduced ends respectively received in the receptacles. The elastic means is U shaped and includes two coiled end sections respectively mounted around the reduced ends of the first section of the hook. Each coiled end section has a distal end securely received in an associated positioning hole to retain the elastic means in place.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
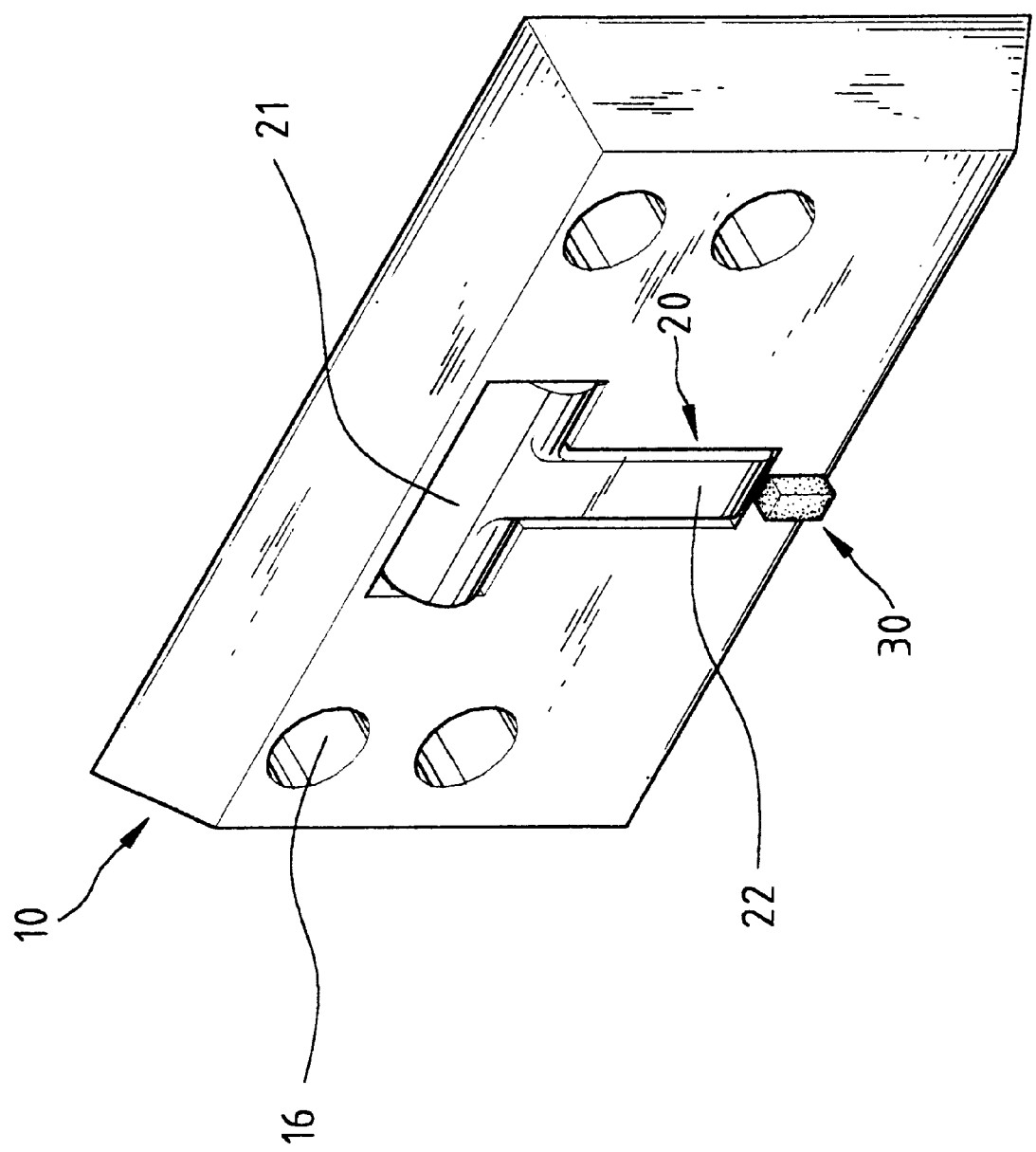
FIG. 1 is a perspective view of a hidden type hook device in accordance with the present invention.
Figure 2:
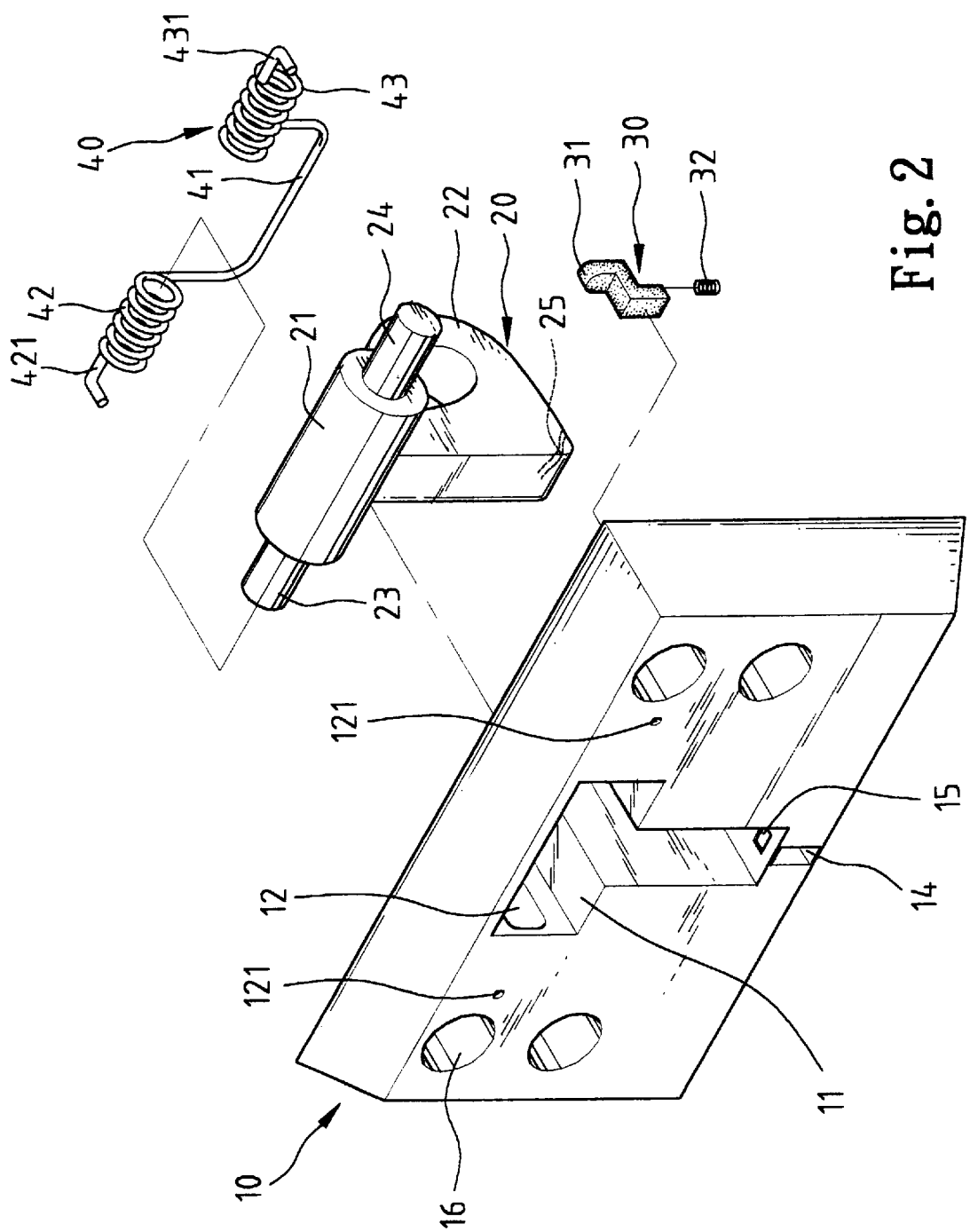
FIG. 2 is an exploded view of the hidden type hook device.

Referring to the drawings and initially to FIGS. 1 and 2, a hidden type hook device in accordance with the present invention generally includes a panel 10 having a number of holes 16 so as to be attached to a peripheral edge (not shown) of a deck frame (not shown) of a truck (not shown) or the like. The panel 10 includes a compartment 11. In this embodiment, the compartment 11 is substantially T shaped and includes a vertical section and a horizontal section. As shown in FIG. 2, each of two end walls that respectively define two ends of the horizontal section includes a receptacle 12 defined therein. Two positioning holes 121 are defined in the panel 10 and each of which is communicated to and adjacent to an associated receptacle 12. The panel 10 further includes a chamber 14 defined therein and communicated with the vertical section of the compartment 11 via a slot 15. An elastic member 32 is received in the chamber 14. A push button 30 is mounted in the chamber 14 and biased by the elastic member 11 to move toward the vertical section of the compartment 11. The push button 30 includes an engaging end 31 extended through the slot 15 into the vertical section of the compartment 11, which will be described later.

Still referring to FIG. 2, the hook device further include a hook 20 that includes an axle 21 pivotally received in the horizontal section of the compartment 11. In this embodiment, the axle 21 of the hook 20 includes two reduced ends 23 and 24 that are respectively received in the receptacles 12. The hook 20 further includes a hooked section 22 removably received in the vertical section of the compartment 11. The hooked section 22 may include an engaging member, e.g., a protrusion 25 projecting outwardly therefrom.

Still referring to FIG. 2, an elastic means 40 is provided for moving the hooked section 22 to a position outside the compartment 11. In this embodiment, the elastic means 40 is substantially U shaped and includes two coil end sections 42 and 43 respectively mounted around the reduced ends 23 and 24 of the axle 21 of the hook 20, each coil end section 42, 43 having a distal end 421, 431 securely retained in an associated positioning hole 121 to retain the returning means 40 in place.

Figure 5:
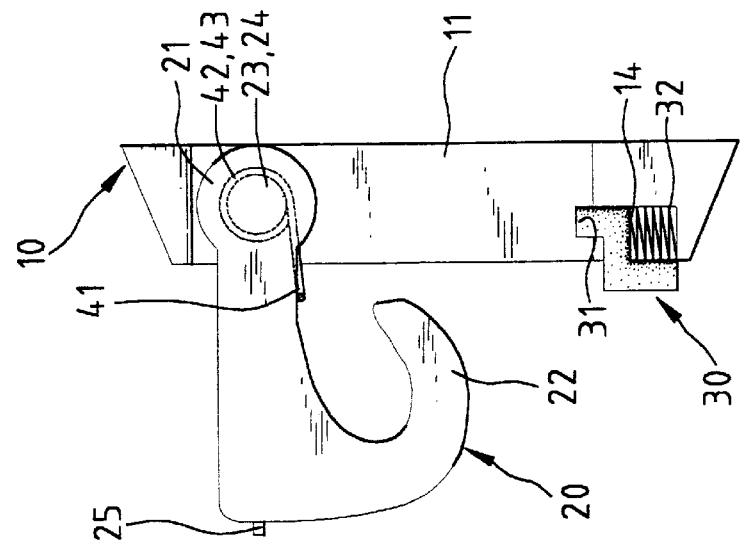
FIGS. 3 to 5 are sectional views illustrating operation of the hook device.
Figure 4:
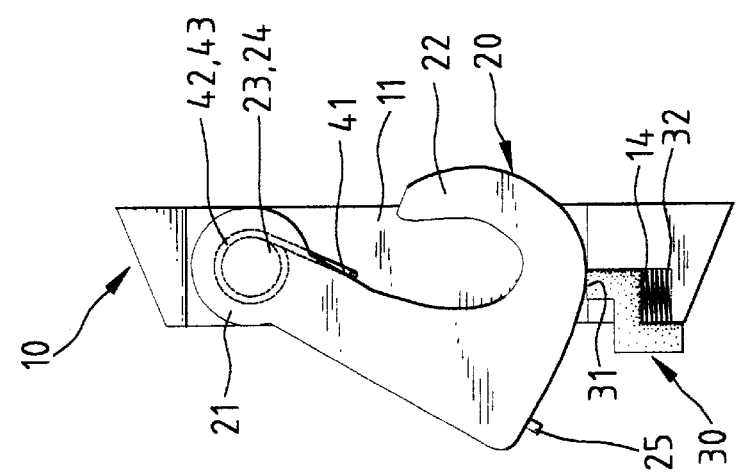
Figure 3:
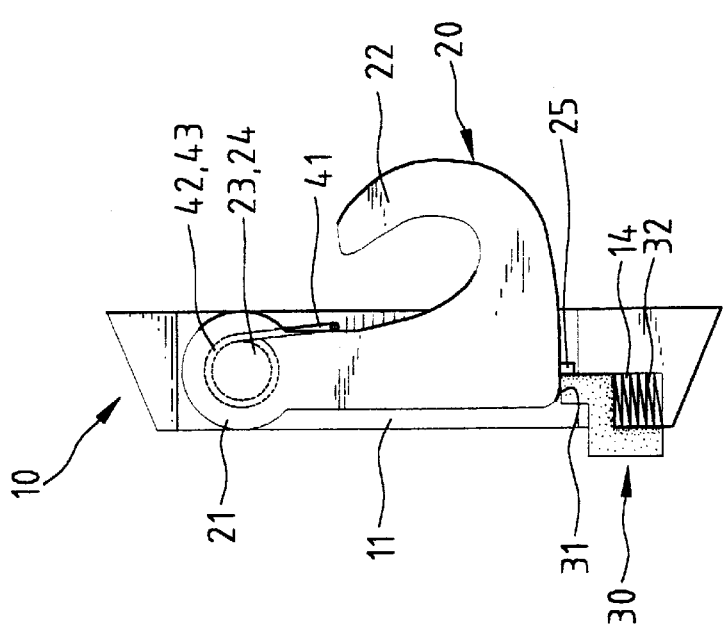
Figure 6:
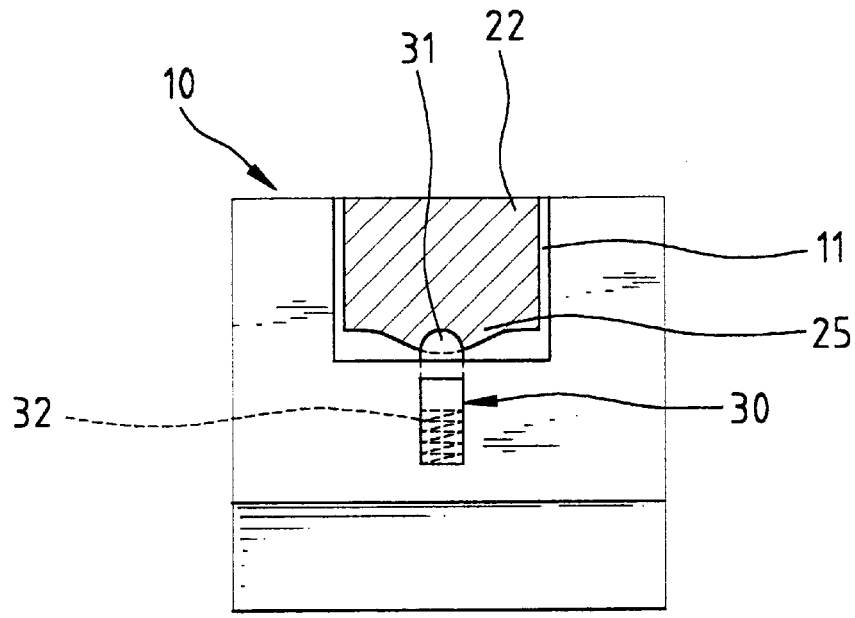
FIG. 6 is an enlarged view, from a left side of FIG. 3, of a portion of the hook device.
Figure 7:
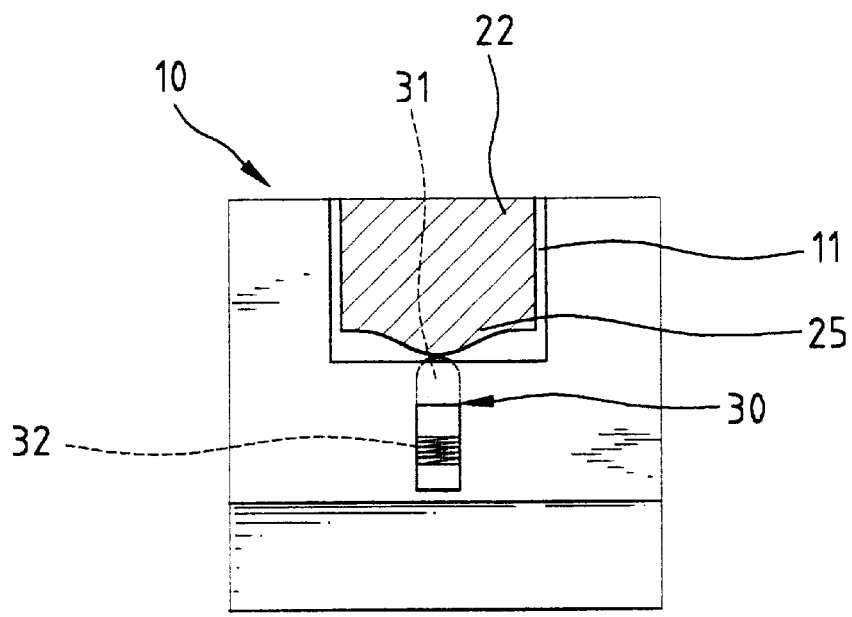
FIG. 7 is an enlarged view, from a left side of FIG. 6, of a portion of the hook device.

Referring to FIGS. 1, 3, and 6, the engaging end 31 of the push button 30 is engaged with the protrusion 25 of the hook 20 under the action of the elastic member 32 to keep the hook 20 in a hidden status. When in use, the push button 30 is pushed to make the engaging end 31 move downwardly and thus disengage from the protrusion 25 of the hook 20, as shown in FIGS. 4 and 7. As a result, as shown in FIG. 5, the hooked section 22 is moved outside the vertical section of the compartment 11 for operation, which is conventional and therefore not further described.

Figure 8:
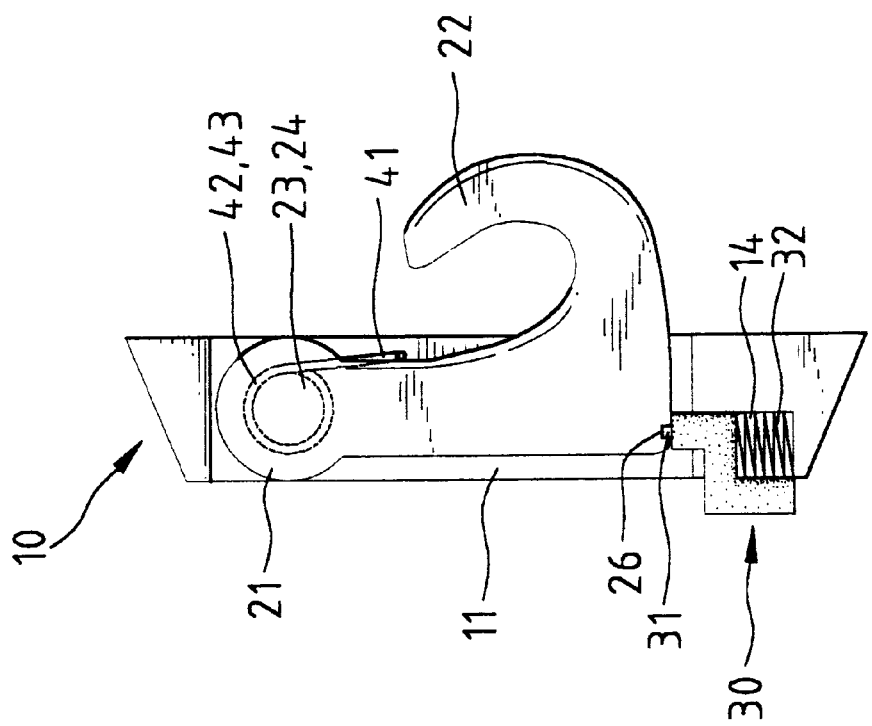
FIG. 8 is a sectional view illustrating a modified embodiment of the invention.

FIG. 8 illustrates a modified embodiment of the invention, in which the protrusion of the hook 20 is replaced by a recess or groove 26 defined in the hooked section 22.

According to the above description, it is appreciated that the hidden type hook device is convenient and may protect users. In addition, the hidden type hook device of the present invention may be used not only in trucks but also walls or the like for different purposes.

Although the invention has been explained in relation to its preferred embodiment, it is to be understood that many other possible modifications and variations can be made without departing from the spirit and scope of the invention as hereinafter claimed.

What is claimed is:

1. A hook device for trucks, comprising:

a panel including a compartment, the compartment including a vertical section and a horizontal section, the horizontal section being defined by two end walls, each said end wall having a receptacle defined therein, the panel further comprising two positioning holes defined therein, each said positioning hole being communicated with an associated said receptacle, a chamber being defined in the panel and located below the vertical section, a slot being defined in the panel for intercommunicating the vertical section with the chamber, a hook including a first section with an axle that has two reduced ends received in the receptacles of the horizontal section of the compartment, respectively, the hook further including a second hooked section removably received in the compartment, the second hooked section of the hook including a protrusion formed thereon, a first elastic means for moving the second hooked section of the hook outside the compartment, the first elastic means being U shaped and including two coiled end sections respectively mounted around the reduced ends of the first section of the hook, each said coiled end section having a distal end securely received in an associated said positioning hole to retain the first elastic means in place, a push button for releasably retaining the second hooked section of the hook in the compartment, the push button including an engaging end slidable extended into the vertical section of the compartment via the slot for releasably engaging with the protrusion of the hook, and a second elastic means mounted in the chamber for biasing the push button to a position for engaging with the protrusion of the hook, whereby the second hooked section is received in the compartment when the push button is in a first position that engages with the protrusion of the second hooked section, and the second hooked section is moved outside the compartment by the first elastic means when the push button is moved to a second position that disengages from the protrusion of the second hooked section.

* * * * *